United States Patent [19]

Kato

[11] Patent Number: 4,780,593

[45] Date of Patent: Oct. 25, 1988

[54] BALANCE CORRECTING APPARATUS FOR A ROTATING BODY

[75] Inventor: Motonobu Kato, Hiroshima, Japan

[73] Assignee: Mazda Motor Corporation, Hiroshima, Japan

[21] Appl. No.: 42,723

[22] Filed: Apr. 27, 1987

[30] Foreign Application Priority Data

Apr. 28, 1986 [JP] Japan .................................. 61-96911

[51] Int. Cl.[4] .............................................. B23K 9/04
[52] U.S. Cl. .................................... 219/125.1; 73/469; 219/137 R
[58] Field of Search ...................... 219/137 R, 125.1; 73/468, 469, 470

[56] References Cited

U.S. PATENT DOCUMENTS 4,295,032 10/1981 Sasaki .............................. 219/137 R Primary Examiner—Clifford C. Shaw
Attorney, Agent, or Firm—Wegner & Bretschneider

[57] ABSTRACT

The unbalance in rotating equilibrium of a rotating body is corrected by carrying out a padding welding on the rotating body.

The correction of the unbalance is carried out, first, by determining a position and an amount to be padded on the rotating body on the basis of measurements on a bearing of the rotating unbalance and an unbalanced mass and then by carrying out the padding welding in a predetermined amount at a predetermined position while varying a relative position between the rotating body and the padding welding means.

This enables a full automation of the unbalance correction of a rotating body.

12 Claims, 4 Drawing Sheets

BALANCE CORRECTING APPARATUS FOR A ROTATING BODY

BACKGROUND OF THE INVENTION

1. Field of the Invention

The present invention relates to a balance correcting apparatus for a rotating body and, more particularly, to an apparatus for correcting the rotating unbalance of a rotating disc body such as a turbine part of a torque converter.

2. Description of Prior Art

A rotating body designed to rotate about one axis is subjected to correction of the rotating unbalance after manufacturing. For example, Japanese Patent Early Publication No. 114,735/1985 discloses a balance correcting apparatus for an engine output shaft (a crank shaft).

The correction of the unbalance of a rotating disc body such as a turbine part of a torque converter has heretofore been made generally by manual work of an operator on the basis of information gained by measurement for a bearing of the rotating unbalance and an unbalanced mass. After measurement, the operator singles out one piece out of prepared adjusting pieces for use on adjustment of the rotating unbalance of the rotating disc body and carries out the spot welding on the rotating disc body at a predetermined position in the bearing of the unbalance.

This balance correction method requires the pre-preparation of a number of adjusting pieces having different weights. It is, however, to be noted here that limits should be set upon the number of adjusting pieces to be prepared from the practical point of view and that weights of such adjusting pieces should be selected in an interruptively stepwise order. Accordingly, the necessity has often arisen that an operator should use an adjusting piece of a weight close to the unbalanced weight of a rotating body to be corrected. In this case, in order to offset the difference in weight between the unbalanced weight of the rotating body to be corrected and the weight of the adjusting piece to be picked up by the operator, the position of welding should be determined by displacement in a radial direction of the rotating body. It should be noted here, however, that an amount of displacement of the welding position has been determined on the basis of a skill of the operator so that this balance correction work has been rendered laborious and inefficient.

SUMMARY OF THE INVENTION

The present invention has the object to provide a balance correcting apparatus designed to be capable of automatically carring out correction work for correcting the rotating unbalance of a rotating disc body.

The present invention has departed and developed from the recognition that, in instances where a pre-prepared adjusting piece is used as in prior art techniques, the unbalance correction has its limits in itself even if the welding could be made automatically. The present invention has now been completed by correcting the unbalance in weight using a padding welding such as an arc welding. The padding welding can be effected by vary a relative position of the rotating body with respect to welding means, thereby to widen freedom of degrees of correction.

The present invention has been constructed in summary such that unbalance correcting apparatus for a rotating body contains measuring means for measuring a bearing of the rotating unbalance and an unbalanced mass of the rotating body while the rotating body is being rotated, welding means for subjecting the rotating body to a padding welding, which is arranged facing the rotating body supported by the measuring means, and a control unit for determining a position at which the rotation of the rotating body is suspended on the basis of information on the bearing of the unbalance and the unbalanced mass provided by the measuring means and, at the same time, for determining an amount to be padded in accordance with the unbalanced amount while varying a relative position between the rotating position and the welding means with reference to the bearing of the unbalance.

With this construction, the correction adapted to the unbalanced mass can be made automatically. Since the present invention allows the padding welding while displacing the relative position between the rotating body and the welding means, no padding is formed on one spot and a padded portion is not caused to bulge out to a large extent from the surface of the rotating body. Thus, the present invention has the advantage that the freedom to determining amounts of the unbalance to be corrected is rendered large.

The padding welding may be carried out by fixing a position of the welding means while the rotating body is caused to rotate or by holding the rotating body in a suspended state while displacing the welding means. In the latter case, the welding means may be displaced in a radial direction (in a bearing of the rotating unbalance) of the rotating body or in a circumferential direction thereof.

In the case where the padding welding is carried out in the circumferential direction of the rotating body, it is caused necessary to remeasure the balance of the rotating body if a portion where padded is too long. Thus, it is practical to set a maximum amount for one shot of padding and follow the procedures in such a manner that, if an amount to be padded is larger than the maximum amount, the padding is once conducted in an amount as much as the maximum amount and, after the welding means is displaced to a predetermined position in the radial direction of the unbalance on the rotating body, an amount corresponding to the rest of the unbalanced weight is padded again in the circumferential direction thereof. Alternatively, it is possible to carry out the padding in an amount corresponding to the maximum amount set and then, after the weight unbalance is measured again, the correction of the unbalance is made in the remeasured bearing of the unbalance and the newly unbalanced mass.

As means for the padding welding may be used an arc welding machine of the type known to the art. This arc welding machine is generally designed so as to allow the arc core to be fed at a constant rate so that it is preferred to adjust an amount to be padded in accordance with a welding time by keeping welding conditions constant such as a rate of displacing the arc welding machine and an arcing output. Thus, it is possible to make a cross-sectional area of the padded portion constant.

The order objects and advantages of the present invention will become apparent during the course of the detailed description thereof with reference to the drawings attached hereto.

DETAILED DESCRIPTION OF THE PREFERRED EMBODIMENTS

Figure 1:
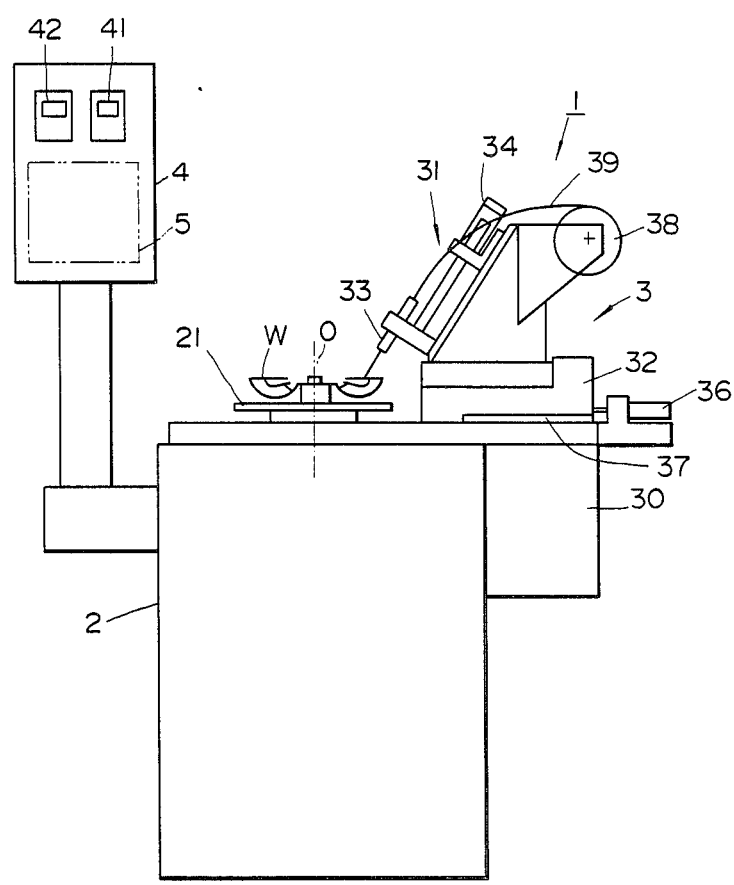
FIG. 1 is a side view illustrating a balance correcting apparatus as one embodiment according to the present invention.
Figure 2:
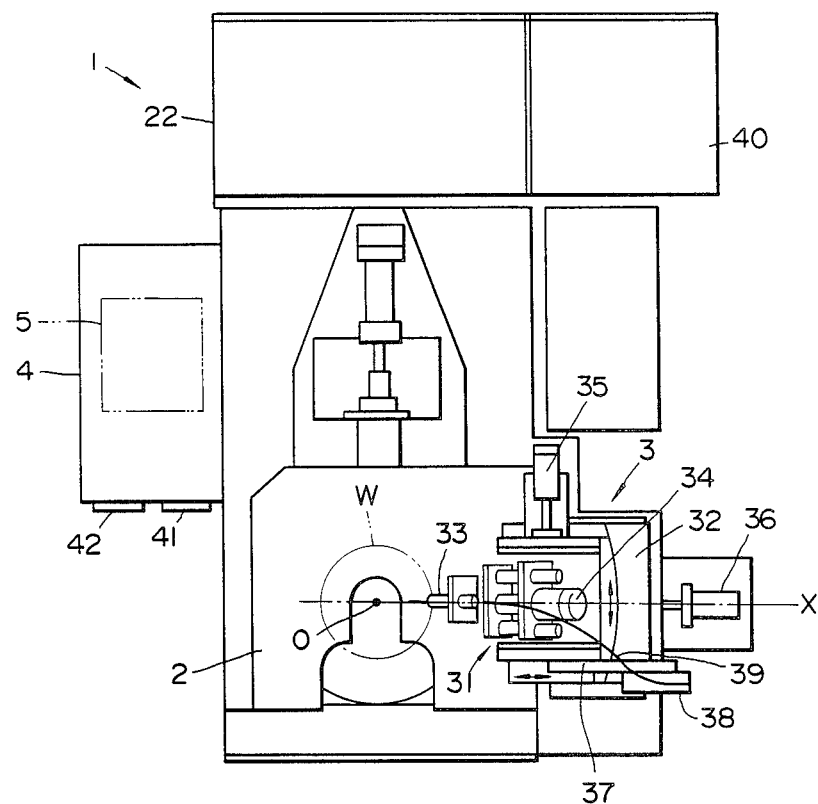
FIG. 2 is a plane view illustrating the balance correcting apparatus as one embodiment according to the present invention.

Referring to FIG. 1, FIG. 2, a balance correcting apparatus 1 contains a balance measuring device 2, a welding device 3 and a controller 4.

The balance measuring device 2 is of the type known to the art and containing a rotary saucer 21 supported in a floating manner and is designed so as to measure a bearing of the rotating unbalance and an unbalanced mass of a work W by rotating the work W mounted on the rotary saucer 21. The work W illustrated here is a turbine of a torque converter. In FIG. 2, reference numeral 22 denotes a driving unit of the balance measuring device 2.

The welding device 3 is mounted on one side of the balance measuring device 2 and a base plate 30 of the welding device 3 is integrally fixed to the balance measuring device 2. A main body 31 of the welding device 3 is mounted to the base plate 30 through an intermediate supporting plate 32. The main body 31 comprises an arc welding machine and its torch 33 is arranged facing the work W mounted on the balance measuring device 2.

The torch 33 is designed so as to be allowed to approach to or depart from the work W by means of a first cylinder 34. The main body 31 of the welding device 3 is mounted so as to be pivotable about the rotation center O of the work W by means of a second cylinder 35. The intermediate supporting plate 32 is designed so as to reciprocably move along the imaginary straight line X passing through the rotation center O of the work W by means of a third cylinder 36, as shown specifically in FIG. 2. In the drawings, reference numeral 37 denotes a slide guide.

To the torch 33 is fed a core 39 from a core feeder 38 in a conventional manner. In FIG. 2, reference numeral 40 denotes a control unit of the welding device 3.

In the controller 4 is mounted an angle meter 41 for indicating an bearing in which the unbalance in weight is caused during rotation and a mass meter 42 for indicating an unbalanced mass that is required to offset the unbalance in the weight of the work W. The controller 4 contains a control unit 5.

Figure 3:
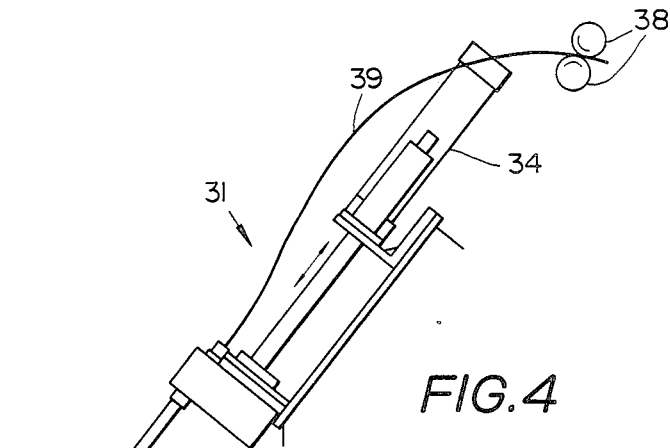
FIG. 3 is a paratially enlarged side view illustrating an arc welding machine.
Figure 4:
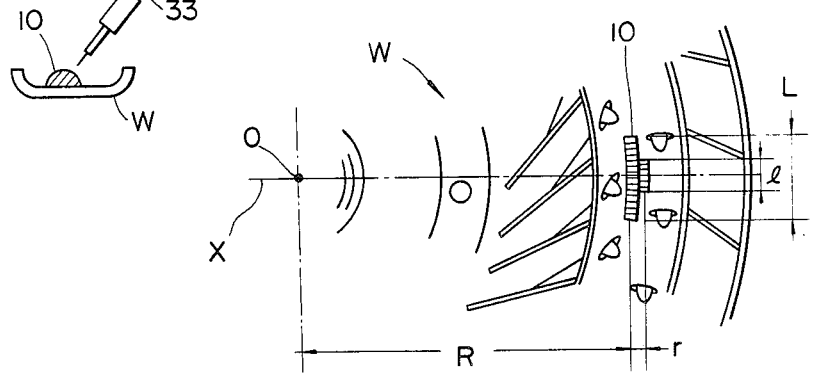
FIG. 4 is a schematic representation of a portion of the work W, illustrating the principle of the correction of the balance.
Figure 5:
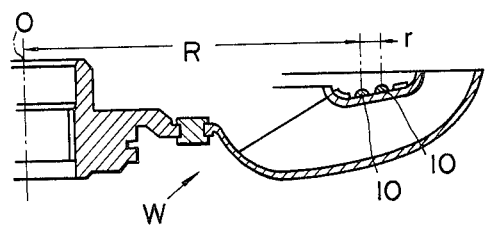
FIG. 5 is a schematic representation in section of a portion of the work W, illustrating the principle of the correction of the balance.

Referring now to FIGS. 3 through 5, the principle of the correction of the weight unbalance of a rotating body will be described. A mass of the unbalance may be represented here by (an amount to be padded) X R (in which R is a radial distance from the rotation center O of the work W to a position where the padding is to be made). In accordance with the present invention, the correction of the unbalance may be made by varying an amount to be padded on the rotating body while making the distance R constant or by varying the distance R while making the padding amount constant.

The padding amount may be represented by the formula: (a cross-sectional area of a core)×(a specific gravity of the core)×(an amount of the core fed). The cross-sectional area of a padding portion 10 may vary with a welding condition such as an arcing output, a rate of feeding the core 39, a welding time or a relative rate of displacement between the work W and the torch 33. A predetermined amount may be padded by varying a cross-sectional area of the padding portion 10, more specifically, by means of a method in which a rate of feeding the core 39 is varied while making the arcing output, the welding time and the length of the padding portion constant or by varying a length L of the padding portion 10 while making the cross-sectional area of the padding portion constant, more specifically, by means of a method in which the welding time is varied while making, for example, the arcing output and a rate of feeding the core 39 constant.

Figure 6:
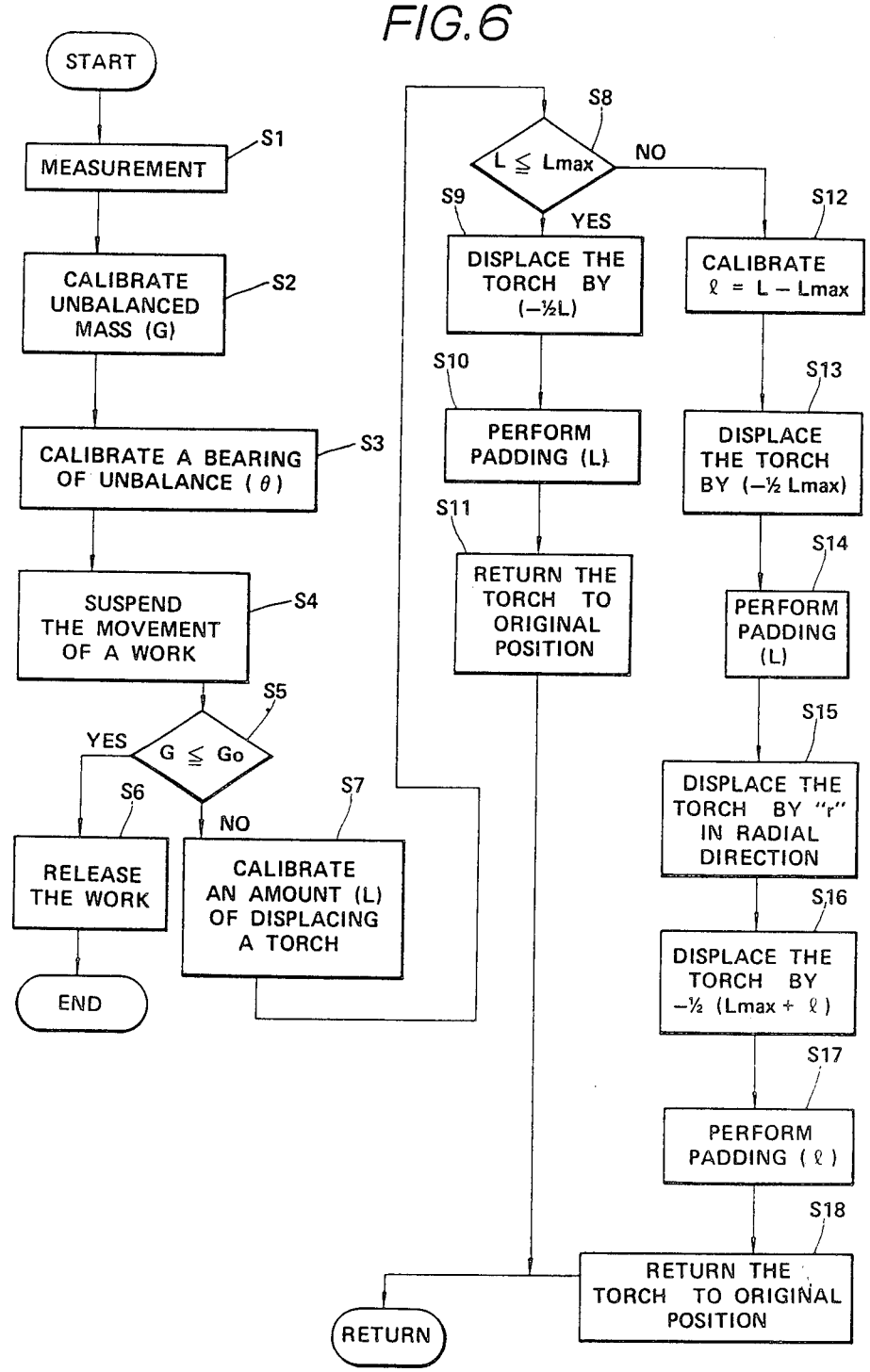
FIG. 6 is a flow chart illustrating an example of a control of the balance correction.

Turning now to FIG. 6, a preferred embodiment on a control of the correction of the rotating unbalance using the control unit 5 will be described under the conditions that follow. In this embodiment, the cross-sectional area of the padding portion is set constant by varying a welding time, that is, an amount of the core 39 fed, while making welding conditions constant, such as an arcing output, a rate of feeding the core 39 and a relative rate of displacement between the work W and the torch 33. It is further to be noted here that the padding is made by displacing the torch 33 in the circumferential direction of the work W in such a manner that a maximum value (Lmax) is set for a length (L) of a portion to be padded per one shot of welding and, in the event that an actual amount to be padded exceeds the maximum value, the first padding is conducted in an amount corresponding to the maximum value and the second padding is then conducted in an amount corresponding to the rest of the unbalanced mass at a position where the torch 33 is displaced by a predetermined distance "r" outward in the radial direction from the position R apart by the distance R from the rotation center O of the work W in the radial direction thereof.

As shown in FIG. 6. the measurement is carried out in step S1, and an unbalanced mass (G) and a bearing of the rotating unbalance ($\theta$) are calibrated, respectively, in steps S2 and S3. The unbalanced mass (G) calibrated here is a length in a radial direction from the rotation center O of the work W to a position where being padded as a predetermined value R. Thus, a value calibrated in step S2 means a length (L) of a portion to be padded.

In step S4, the work W is suspended at a position where the torch 33 coincides with the bearing of the unbalance ($\theta$) and then it is distinguished whether the correction of unbalance is necessary or not. If the unbalanced mass (G) is within a tolerance (Go), no correction is required, and the flow then proceeds to step S6 where the work W is released.

On the other hand, if it is distinguished in step S5 that the unbalanced mass (G) exceeds the tolerance (Go), the correction is required and the flow proceeds to step S7.

In step S7, an amount (L) of displacing the torch 33 is calibrated on the basis of the unbalanced mass (G) caliblated in step S2. In step S8, it is distinguished whether or not the amount (L) of displacing the torch 33 is below the maximum value (Lmax). When it is distinguished that the amount (L) is below the maximum value (Lmax), the flow advances to step S9 where it is performed to displace the torch 33 by $-\frac{1}{2} \times L$ from the original position. In step 10, the padding welding is conducted in an amount as much as the symbol (L). After the padding welding is finished, the torch 33 is returned to the original position in step S11. It is to be noted that the original position of the torch 33 is the position R in the bearing of unbalance ($\theta$).

In the step S8, when it is distinguished that the amount (L) of displacing the torch 33 exceeds the maximum value (Lmax), on the other hand, the flow proceeds to step S12. In step S12, there may be calibrated, as an amount of the rest being padded for the second padding, a length (l) of the rest as the following equation:

$$l = L - Lmax$$

In instances where the torch 33 is displaced by the predetermined amount (r) outward in the radial direction from the position R, it is desirable to correct the amount (l) corresponding to the rest in accordance with the unbalanced mass represented by (an amount to be padded)$\times$R. This correction may be made preferably by multiplying the length (l) of the rest by a correction coefficient k (k<1) or by reducing a correction amount (l') from the length (l).

In step S13, the torch 33 is displaced by a distance $(-\frac{1}{2} \times Lmax)$ from the original position in order to carry out first padding in the amount as much as the maximum value (Lmax) at the position R. The flow then advances to step S14 where the first padding welding is carried out.

In step S15, the torch 33 is caused to be displaced by an predetermined amount (r) in the radial direction and, in step S16, it is displaced by a distance $-\frac{1}{2} \times (Lmax + l)$. The flow then proceeds to step S17 where the rest to be padded is welded as the second padding welding. In step S18 the torch 33 is returned to the original position.

It is to be understood that the present invention is not intended in any means to be limited to those described hereinabove and the present invention should be interpreted as encompassing within the scope and spirit thereof any and all variations and modifications not deviating from the principle of the correction of the unbalance as described hereinabove.

What is claimed is:

1. A balance correcting apparatus for a rotating disc body comprising:
   measuring means for measuring the location and amount of unbalance of said body being rotated;
   welding means for welding pads on the rotating body, said welding means being arranged facing said body;
   suspension position setting means for setting a position of suspension of the rotation of said body, based on a result from said measuring means, so as to allow said location to coincide with a welding portion of said welding means;
   padding length setting means for setting a length of the pads in an amount corresponding to said unbalanced mass, based on a result from said measuring means; and
   welding control means for controlling the pad welding by said welding means, based on said length of the pads set by said padding length setting means, while either said body or said welding means is displaced on the basis of said position of unbalance.

2. A balance correcting apparatus as claimed in claim 1, wherein the cross-sectional area of said pads on said body is constant.

3. A balance correcting apparatus as claimed in claim 1, wherein said welding control means for controlling the pad welding while said welding means is being moved is suspended.

4. A balance correcting apparatus as claimed in claim 3, wherein said welding means is transferred around the circumference of said body.

5. A balance correcting apparatus as claimed in claim 1, wherein said welding means is an arc welding device.

6. A balance correcting apparatus as claimed in claim 1, wherein the amount of the pads is adjusted by varying the welding time while the arcing output and the rate of feeding an arcing core for said arc welding device is constant.

7. A balance correcting apparatus as claimed in claim 1, wherein said body is a turbine of a torque converter.

8. A balance correcting apparatus for a rotating disc body comprising:
   measuring means for measuring the location and amount of unbalance of said body being rotated;
   welding means for welding pads on said rotating disc body, said welding means being arranged facing said body;
   suspension position setting means for setting a position of suspension of the rotation of said body, based on a result from said measuring means, so as to allow said location to coincide with a welding portion of said welding means;
   padding length setting means for setting a length of the pads in an amount corresponding to said unbalanced mass, based on a result from said measuring means;
   welding control means for controlling the pad welding by said welding means, based on said length of the pads set by said padding length setting means, while said welding means is displaced in a circumferential direction of said body on the basis of said position of unbalance;
   maximum padding length setting means for setting a maximum value on said length of the pads set by said padding length setting means; and
   welding position altering means for altering a welding position on said body for welding the rest of the pads in a circumferential direction of said body by displacing said welding means in a radial direction of said body after the pad welding was effected on another welding position in an amount corresponding to said maximum value set by maximum padding length setting means when said length of the pads set by said padding length setting means is larger than said maximum value.

9. A balance correcting apparatus as claimed in claim 8, wherein the cross-sectional area of said pads on said body is constant.

10. A balance correcting apparatus as claimed in claim 8, wherein said welding means is an arc welding device.

11. A balance correcting apparatus as claimed in claim 8, wherein the amount of the pads is adjusted by varying the welding time while the arcing output and the rate of feeding an arcing core for said arc welding device is constant.

12. A balance correcting apparatus as claimed in claim 8, wherein said body is a turbine of a torque converter.

* * * * *